(12) United States Patent
Sivaswamy et al.

(10) Patent No.: US 12,346,787 B2
(45) Date of Patent: Jul. 1, 2025

(54) ARTISAN LEARNING SYSTEM

(71) Applicant: International Business Machines Corporation, Armonk, NY (US)

(72) Inventors: Hemant Kumar Sivaswamy, Pune (IN); Pritam Chopdar, Pune (IN); Venkata Vara Prasad Karri, Visakhapatnam (IN); Shikhar Kwatra, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 17/452,618

(22) Filed: Oct. 28, 2021

(65) Prior Publication Data

US 2023/0133511 A1 May 4, 2023

(51) Int. Cl.
*G06N 3/008* (2023.01)
*G06F 3/01* (2006.01)
(Continued)

(52) U.S. Cl.
CPC ............. *G06N 3/008* (2013.01); *G06F 3/014* (2013.01); *G06F 3/016* (2013.01); *G06N 3/006* (2013.01);
(Continued)

(58) Field of Classification Search
CPC ........ G06N 3/008; G06N 3/006; G06N 3/045; G06N 3/08; G06N 3/0475; G06N 3/092;
(Continued)

(56) References Cited

U.S. PATENT DOCUMENTS 9,390,630 B2 7/2016 Daniels
10,504,268 B1 12/2019 Huang
(Continued)

FOREIGN PATENT DOCUMENTS

EP 33410931 A 7/2018
WO 2021021328 A2 2/2021

OTHER PUBLICATIONS

"Craft", Wikipedia, last edited on Sep. 25, 2021, 4 pages, <https://en.wikipedia.org/wiki/Craft>.
(Continued)

*Primary Examiner* — Michael C Zarroli
(74) *Attorney, Agent, or Firm* — Randy Tejeda

(57) ABSTRACT

One or more computer processors derive a base corpus by capturing time series haptic data from an artisan performing an artisanal skill comprising a plurality of artisanal actions, wherein each artisanal action in the plurality of artisanal actions is associated with a time interval. The one or more computer processors train a multi-agent reinforcement learning (MARL) model utilizing the derived base corpus, wherein the MARL model outputs a vector representing one or more predicted artisanal actions required to complete the artisanal skill. The one or more computer processors generate a training avatar utilizing a trained generated adversarial network fed with one or more user parameters identified from a user requesting guidance for the artisanal skill and the output vector of the trained MARL model. The one or more computer processors guide the user with the generated training avatar in an execution of the artisanal skill.

20 Claims, 3 Drawing Sheets

(51) Int. Cl.
*G06N 3/006* (2023.01)
*G06N 3/045* (2023.01)
*G06N 3/08* (2023.01)
*G09B 19/00* (2006.01)

(52) U.S. Cl.
CPC .............. *G06N 3/045* (2023.01); *G06N 3/08* (2013.01); *G09B 19/00* (2013.01)

(58) Field of Classification Search
CPC ......... G06F 3/014; G06F 3/016; G09B 19/00; G09B 5/06
See application file for complete search history.

(56) References Cited

U.S. PATENT DOCUMENTS

| | | | |
|---|---|---|---|
| 2017/0036116 A1 | 2/2017 | Cohen | |
| 2019/0318643 A1* | 10/2019 | Pajo | ........................ G09B 7/02 |
| 2020/0051303 A1 | 2/2020 | Li | |
| 2020/0269136 A1 | 8/2020 | Gurumurthy | |
| 2020/0401980 A1 | 12/2020 | Howard | |
| 2022/0101146 A1* | 3/2022 | el Kaliouby | ............. G06N 3/08 |

OTHER PUBLICATIONS

"Dynamic Intelligent Sports Optimization and Enhancement System", Abstract, IPCOM000263963D, Publication Date Oct. 27, 2020, 3 pages, <https://priorart.ip.com/IPCOM/000263963>.

Lioulemes, Alexandros, "Adaptive User and Haptic Interfaces for Smart Assessment and Training", Mar. 7-10, 2016, 4 pages.

Nordmeon et al., "Making Sense of Sensors: Discovery Through Craft Practice with an Open-Ended Sensor Material", DIS '19, Jun. 23-28, 2019, 12 pages.

Okamura et al., "Haptics in Medicine and Clinical Skill Acquisition", EEE Transactions on Haptics, vol. 4, No. 3, Jul.-Sep. 2011, 2 pages, <https:/ieeexplore.ieee.org/stamp/stamp.jsp?tp=&arnumber=5977266>.

Reinhardt et al., "Towards a Novel Methodology for Workflow Capture and Analysis of Carpentry Tasks for Human-Robot Collaboration", Downloaded Apr. 15, 2021, 10 pages.

* cited by examiner

ARTISAN LEARNING SYSTEM

BACKGROUND

The present invention relates generally to the field of machine learning, and more particularly to building a base corpus for hand-craft learning systems.

Artisanship is a technique to create material objects partly or entirely by hand, often the inheritance of a manual skill handed down over centuries. Moreover, artisanship is an important form of cultural expression to the extent that it reflects the aesthetics, the symbolism, and worldviews of productive communities.

A generative adversarial network (GAN) is a class of machine learning system comprising of two neural networks. Given a training set, a GAN learns to generate new data with the same statistics as the training set. For example, a GAN trained on photographs can generate new photographs that look at least superficially authentic to human observers. The generative network generates candidates while the discriminative network evaluates the generated candidates. Typically, the generative network learns to map from a latent space to a data distribution of interest, while the discriminative network distinguishes candidates produced by the generator from the true data distribution. The generative network's training objective is to increase the error rate of the discriminative network (i.e., inducing misclassifications by the discriminator network by producing novel candidates that the discriminator thinks are not synthesized (are part of the true data distribution)).

SUMMARY

Embodiments of the present invention disclose a computer-implemented method, a computer program product, and a system. The computer-implemented method includes one or more computer processors deriving a base corpus by capturing time series haptic data from an artisan performing an artisanal skill comprising a plurality of artisanal actions, wherein each artisanal action in the plurality of artisanal actions is associated with a time interval. The one or more computer processors train a multi-agent reinforcement learning (MARL) model utilizing the derived base corpus, wherein the MARL model outputs a vector representing one or more predicted artisanal actions required to complete the artisanal skill. The one or more computer processors generate a training avatar utilizing a trained generated adversarial network fed with one or more user parameters identified from a user requesting guidance for the artisanal skill and the output vector of the trained MARL model. The one or more computer processors guide the user with the generated training avatar in an execution of the artisanal skill.

BRIEF DESCRIPTION OF THE DRAWINGS

Figure (i.e., FIG. 1 is a functional block diagram illustrating a computational environment, in accordance with an embodiment of the present invention.

DETAILED DESCRIPTION

As technology and modernization advance the number of traditional artisans has tremendously diminished. The acquisition and mastering of an artisanal skill requires significant time and dedication, normally acquired through years of physical apprenticeship with an expert artisan. For example, for a carpenter to correctly plane a piece of wood (i.e., artisanal skill), appropriate palm pressure needs to be applied while supporting the piece of wood at a specific position. The reduction of capable artisans has introduced the problem of losing artisanal skills and talents common to a plurality of industries, cultures, and customs. Although many organizations and governments have recognized this issue and actively attempt to generate artisanal employment in order to preserve associated traditional skills, said attempts are limited due to resource constraints and economic obstacles.

Embodiments of the present invention solve artisanal skill loss by deriving a base corpus of artisanal skills through a haptic capture device, allowing the incorporation of the base corpus into educational or collaborative tools. Embodiments of the present invention utilize specifically trained GAN models to generate training avatars specific to the conditions, skill level, mannerisms, and limitations of the user, where the present invention guides the user in an artisanal skill utilizing the created training avatars to present suggests, recommendations, or instructions. Embodiments of the present invention improve existing educational tools through the incorporation of haptic capture devices and haptic response feedback. Embodiments of the present invention improve artisanal user guidance by providing dynamic instructions relative to the user, environment, and artisanal skill. Embodiments of the present invention improve robotic manufacturing systems through the mapping of artisanal skills and actions to tools available within the robotic manufacturing system. Implementation of embodiments of the invention may take a variety of forms, and exemplary implementation details are discussed subsequently with reference to the Figures.

The present invention will now be described in detail with reference to the Figures.

Figure 1:
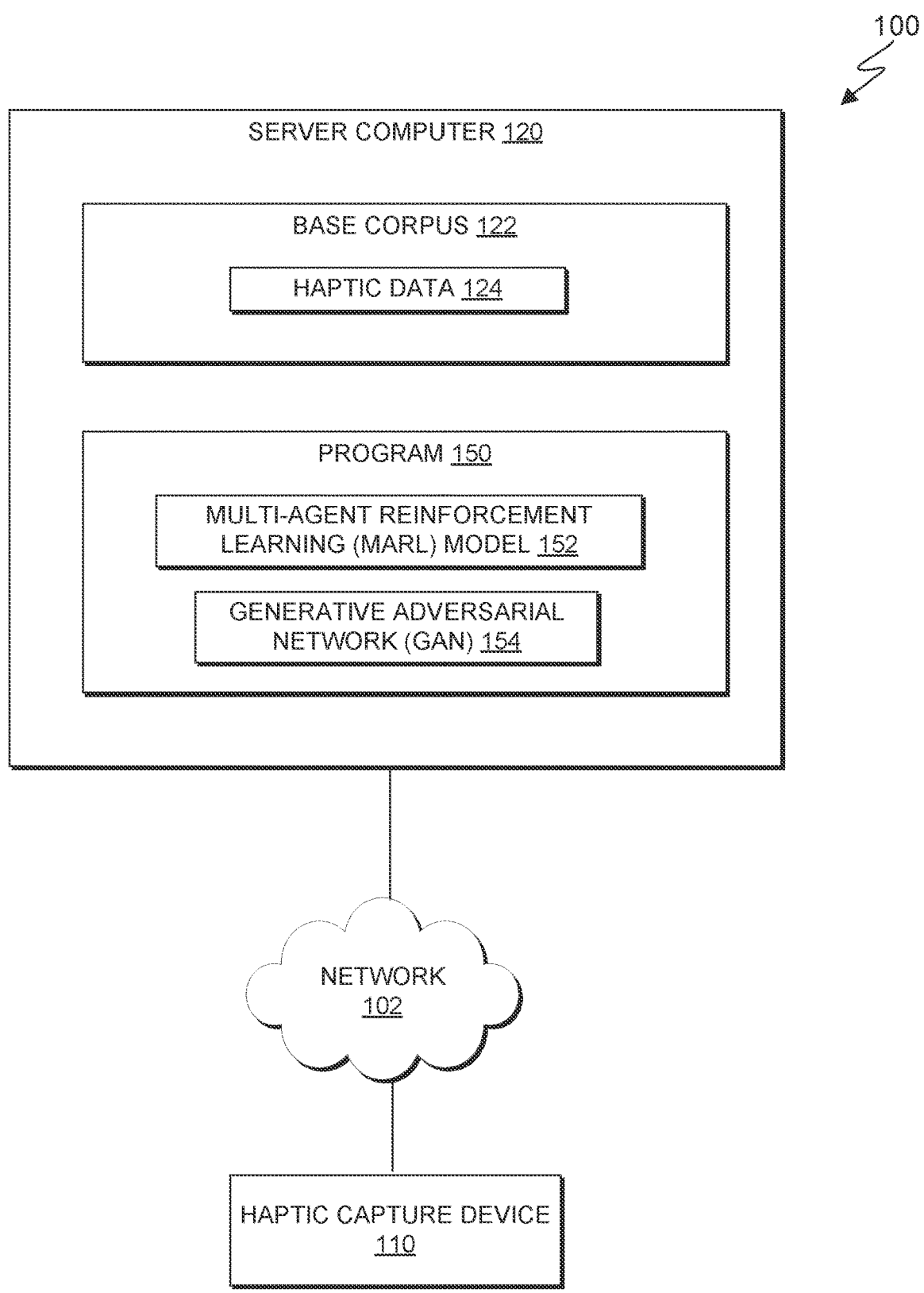

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes haptic capture device 110 and server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Haptic capture device 110 captures artisanal skills (e.g., handcrafts, sports, manufacturing, dancing, playing musical instruments, etc.) conducted by an artisan (e.g., expert) or user (e.g., trainee) utilizing a plurality of sensors and actuators providing haptic data 124, such as user joint angles and 3D hand positioning, acceleration, tactile feedback, and/or user grip pressure. In an embodiment, haptic capture device 110 includes a motion tracker, such as a magnetic tracking device or inertial tracking device, capturing global position/rotation data of the artisan or user. In another embodiment, haptic capture device 110 is a full body haptic suit that monitors and captures information associated with a plurality of joints and appendages. In an embodiment, haptic capture device 110 includes visual sensors that monitor general body positions. For example, haptic capture device 110 visually monitors and collects information regarding the body position (e.g., user posture, relative position of user appendages, user head position, etc.) of a standing carpenter hand sawing. In an embodiment, haptic captures device 110 utilizes markerless motion capture techniques to capture haptic data 124 from the perspective of the artisan.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes base corpus 122 and program 150. In other embodiments, server computer 120 may contain other applications, databases, programs, etc. which have not been depicted in computational environment 100. Server computer 120 may include internal and external hardware components, as depicted and described in further detail with respect to FIG. 3.

Base corpus 122 is a repository for data used by program 150. In the depicted embodiment, base corpus 122 resides on server computer 120. In another embodiment, base corpus 122 may reside elsewhere within computational environment 100 provided program 150 has access to base corpus 122. Base corpus 122 is an organized collection of data. Base corpus 122 can be implemented with any type of storage device capable of storing data and configuration files that can be accessed and utilized by program 150, such as a database server, a hard disk drive, or a flash memory. Base corpus 122 contains haptic data 124 collected through haptic capture device 110, wherein haptic data 124 is a structured plurality of time series information. In this embodiment, haptic data 124 describes time series information collected as an artisan performs one or more artisan skills, sequences, or actions. For example, haptic capture device 110 captures how an artisan (e.g., potter) performs a "throw off the hump" method (i.e., artisanal skill), where the artisanal skill is comprised of one or more artisanal actions comprising wedging the clay, centering, opening, etc. In this example, haptic data 124 represents each artisanal action in an artisanal skill and describes the action needed to successful accomplish the artisanal skill, such as the required force, pressure, body position, etc. Haptic data 124 describes one or more artisanal skills comprising a plurality of artisanal steps, such as moving the position of a tool with a specific velocity replicating the artisan (e.g., expert). In an embodiment, haptic data 124 includes, but is not limited to, pressure strokes and variations, directional movement, duration of applied pressure, and directional appendage pattern combinations (e.g., elbow, wrist, knee, and neck joints).

Program 150 is a program for artisanship learning utilizing smart haptics and multi-agent reinforcement learning with generative adversarial networks. In various embodiments, program 150 may implement the following steps: derive a base corpus by capturing time series haptic data from an artisan performing an artisanal skill comprising a plurality of artisanal actions, wherein each artisanal action in the plurality of artisanal actions is associated with a time interval; train a multi-agent reinforcement learning (MARL) model utilizing the derived base corpus, wherein the MARL model outputs a vector representing one or more predicted artisanal actions required to complete the artisanal skill; generate a training avatar utilizing a trained generated adversarial network fed with one or more user parameters identified from a user requesting guidance for the artisanal skill and the output vector of the trained MARL model; and guide the user with the generated training avatar in an execution of the artisanal skill. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (e.g., haptic capture device 110) within computational environment 100. In the depicted embodiment, program 150 includes multi-agent reinforcement learning model (MARL) 152 and generative adversarial network (GAN) 154. Program 150 is depicted and described in further detail with respect to FIG. 2.

MARL 152 utilizes multi-agent reinforcement to address sequential decision-making problems (i.e., artisan skill learning). MARL 152 is a multi-agent learning system, trained from base corpus 122, comprising a group of autonomous, interacting agents (i.e., artisans with varied skills, techniques, and limitations (e.g., artisan physical dimensions)) sharing a common environment (i.e., available tools and materials). Although the agents in a multi-agent system are endowed with behaviors (i.e., artisanal actions or sequences) designed in advance, often agents need to learn new behaviors online, such that the performance of the agent or of the whole multi-agent system gradually improves. Furthermore, environment complexity impedes the a priori design of successful agent behaviors. Environments that change over time cause hardwired artisanal actions to be often inappropriate and unsuccessful. The training of MARL 152 is further described in step 204.

GAN 154 is a virtual skill generative adversarial network (GAN) comprising two adversarial neural networks (i.e., generator and discriminator) trained utilizing the output vector of MARL 152 and base corpus 122, representative of a plurality of artisanal actions associated with an artisanal skill. In an embodiment, program 150 trains a discriminator utilizing collected haptic data 124 as described in base corpus 122. In another embodiment, program 150 initializes a generator utilizing randomized haptic data 124 sampled from a predefined latent space (e.g., a multivariate normal distribution), thereafter, candidates (i.e., skill training images and avatars) synthesized by the generator are evaluated by the discriminator. In this embodiment, program 150 applies backpropagation to both networks so that the generator produces more realistic images (e.g., training avatars), while the discriminator becomes more skilled at flagging synthetic images. In an embodiment, the discriminator model assesses the delta from the original image of the user in an augmented reality (AR) view with the avatar created by the generator model. In the depicted embodiment, the generator is a deconvolutional neural network and the discriminator is a convolutional neural network. The creation, training, and utilization of GAN 154 is depicted and described in further detail with respect to FIG. 2.

The present invention may contain various accessible data sources, such as base corpus 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
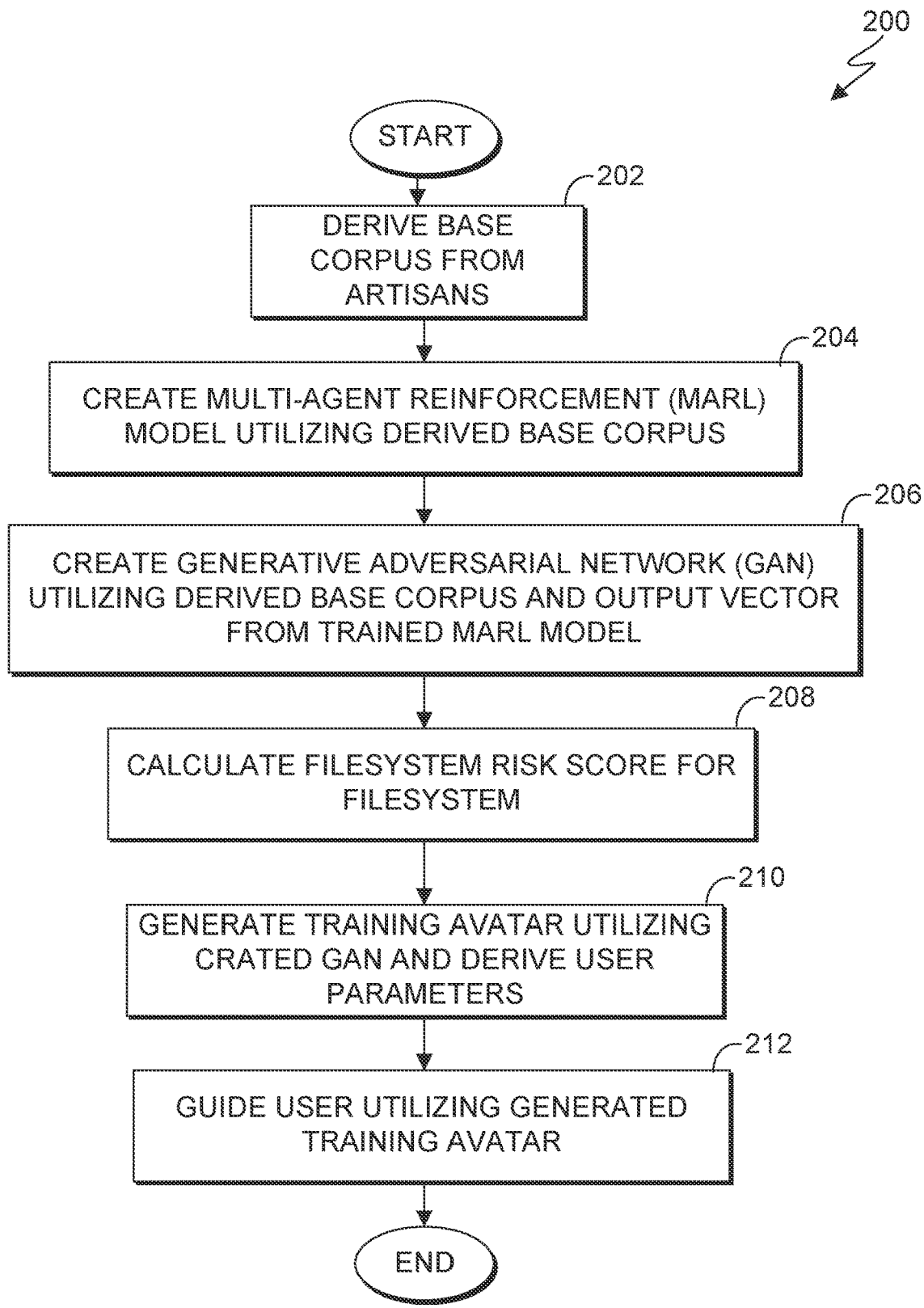
FIG. 2 is a flowchart depicting operational steps of a program, on a server computer within the computational environment of FIG. 1, artisanship learning utilizing smart haptics and multi-agent reinforcement learning with generative adversarial networks, in accordance with an embodiment of the present invention.

FIG. 2 depicts flowchart 200 illustrating operational steps of program 150 for artisanship learning utilizing smart haptics and multi-agent reinforcement learning with generative adversarial networks, in accordance with an embodiment of the present invention.

Program 150 derives base corpus from artisans (step 202). In an embodiment, program 150 initiates responsive to a user request for artisanal skill training or guidance. In another embodiment, program 150 initiates responsive to an identification of a skill or artisan utilizing haptic capture device 110 (e.g., visually identifying artisanal skills). Here, program 150 identifies artisans (i.e., expert craftworkers (e.g., artists)) utilizing visual identifiers and related expertise stored in base corpus 122 (e.g., cloud object storage (COS)). In a further embodiment, haptic data 124 is collected from identified artisans utilizing haptic capture device 110 and stored within base corpus 122 in a dictionary format, where haptic data 124 is specific to particular artisan, craft, job, sport, or activity. In this embodiment, haptic data 124 describes a monitored artisan unique characteristics, mannerisms (e.g., right hand vs left hand), disabilities, and positioning with respect to performing one or more skills. In an embodiment, haptic data 124 is collected, aggregated, and streamed in real-time from the internet of things (IoT) sources (i.e., haptic capture device 110).

Program 150 trains a multi-agent reinforcement learning (MARL) model utilizing derived base corpus (step 204). In an embodiment, program 150 trains MARL 152 utilizing derived base corpus 122. In an embodiment, program 150 trains MARL 152 utilizing deep reinforcement learning to teach agents how to perform an artisanal skill within a dynamic environment (e.g., diverse users, materials, tools, etc.). In this embodiment, program 150 utilizes the time-series information included within haptic data 124, to teach the agent, at each time step, to perceive the state of the environment and take an appropriate artisanal action, which transitions the environment into a new state. In a further embodiment, program 150 applies a scalar reward function to evaluate the quality of each transition, allowing the agent to maximize the cumulative reward along the course of the skill. MARL 152 collects feedback on haptic data utilized to train the user in order to adjust the reward function by internally maximizes the global reward function over iterative time samples while adjusting subsequent predicted artisanal actions. For any given combination of environmental factors and user parameters, MARL 152, responsively, outputs a vector representing one or more artisanal actions (i.e., artisanal skill) necessary to complete the artisanal skill. For example, in a game of baseball or cricket, program 150 instructs a batter to apply a specific force or pressure at a specific timing to successfully hit a pitch into play, specifically appropriate pressure needs to be applied by the bottom hand holding the bat. Here, appropriate pressure and timing are dependent on a plurality of factors such as angular velocity of the pitch, equipment materials, weather conditions, user parameters (e.g., dominant hand, physical limitations, etc.), etc. As the plurality of factors change (e.g., weather variations, etc.) and are inputted into MARL 152, responsively, MARL 152 outputs one or more artisanal actions, ultimately resulting in the successful execution of the artisanal skill.

Program 150 creates a generative adversarial network (GAN) utilizing derived base corpus and output vector from trained multi-agent reinforcement model (step 206). In an embodiment, program 150 creates GAN 154 comprising a generator model and a discriminator model. In this embodiment, program 150 trains said models utilizing supervised training methods with images representative of the intended image style (i.e., artisanal skills) and haptic data 124. In an embodiment, the user indicates a particular image style such an avatar, sample photo, or a style producing varying levels of privacy or obfuscation. In the depicted embodiment, the generator is a deconvolutional neural network and the discriminator is a convolutional neural network. In an embodiment, program 150 trains GAN 154 utilizing artisan images and videos to generate a realistic representation (e.g., avatar) of an artisan performing an artisan skill through identifying the body positioning (position, alignment, and applied force of all ligaments and appendages of the artisan) of the artisan for reconstruction. Program 150 utilizes GAN 154 to create an electronic representation of the user (i.e., avatar) performing an artisanal action from MARL 152 considering a broad range of positions, environments, tools, materials, etc.

Program 150 derives user parameters (step 208). Program 150 identifies and derives a plurality of user parameters that describe the current physical condition of the user and the surrounding environment of the user, where the user requested guidance or assistance in performing an artisan skill or one or more artisanal actions within the artisan skill. In an embodiment, user parameters include, but are not limited to, user preferences (e.g., preferred dominant hand), physical limitations (e.g., reduced strength in right arm), body proportions (e.g., length of arms, ligament rotation ability, etc.), grip strength, etc. For example, program 150 identifies and derives user parameters describing a user with a left arm injury within a machine tooling environment. In these embodiments, program 150 utilizes haptic capture device 110 to visually identify the user and associated user parameters while monitoring the general body and ligament position of the user. For example, haptic capture device 110 visually monitors and collects information regarding user body position (e.g., user posture, relative position of user appendages, user head position, etc.). In an embodiment, program 150 utilizes the derived user parameters to create a digital avatar of the user, as detailed in step 210.

Program 150 generates a training avatar utilizing the created GAN and derived user parameters (step 210). In an embodiment, program 150 generates training avatars based on derived user parameters and the output vector from MARL 152, as described in step 204. In this embodiment, program 150 provides generated avatars ranging from high obfuscated or genericized avatars to photo-realistic representations of the user or artisan. In an embodiment, program 150 generates a video sequence (e.g., live avatar) of a user such that the user is virtually animated according to an output vector of MARL 152 corresponding to an artisanal skill or component artisanal action. In this embodiment, at each time interval, the generator model of GAN 154 creates the training avatar in an augmented or holographic form with associated haptics asserted on the user. In a further embodiment, program 150 generates user representations (i.e., virtual audience members) that consist of a set of learned key points with corresponding local affine transformations to support complex artisan skills and actions. In an embodiment, the created avatar is unique with respect to pressure points and posture based on the skill level, characteristics, habits, mannerisms and positioning of the user attempting to perform the artisanal skill. For example, a left hander carpenter is instructed through the training avatar to apply more pressure with the left hand as compared to a right handed carpenter. In another example, program 150 creates an avatar to assist with carpentry work on an elevated stationary fixture for a user with a leg limitation. In this example, program 150 adjusts the avatar and any associated artisanal action to conform with the abilities, conditions, or limitations of the user. In an embodiment, program 150 restricts (i.e., the GAN is restricted, constrained, modified, etc.) the image generator model utilizing one or more user preferences (e.g., transmission methods, associated computing devices, etc.) and user privacy parameters (e.g., allowed location information, allowed avatar details (e.g., hair color, unique facial features, identifying details, etc.). For example, the user designates that no personal information be present in the generated avatar, thus program 150 generates an image representation only containing a genericized avatar with no applied user preferences (i.e., user physical conditions and limitations).

Program 150 guides a user utilizing generated training avatar (step 212). In an embodiment, program 150 presents and/or adjusts the generated avatar dependent on the capabilities (e.g., display size, resolution, etc.) of the associated application (e.g., chat application, etc.) or associated computing devices. For example, program 150 overlays the avatar over the body of the user while the user is utilizing an AR system. In an embodiment, program 150 projects the generated avatar using screens or projector devices on human mannequins. In a further embodiment, program 150 dictates auditory instructions utilizing existing audio systems within the environment. In an embodiment, program 150 provides the user an artisan action instruction (e.g., technique), as outputted by MARL 152, utilizing the training avatar to demonstrate the artisanal action with user specific instructions for force, body position, pressure, etc. For example, program 150 instructs the user on correct hand direction and orientation while holding a tool needed for performing the artisanal action. In this example, program 150 instructs the user regarding proper posture through the presentation of correct posture utilizing the training avatar. Additionally, program 150 provides for required change of tools through an AR indicator surrounding the correct tool in the environment of the user. In another embodiment, program 150 utilizes the training avatar with associated smart haptics (i.e., haptic glove or suit) to apply haptic response to further assist the user. For example, program 150 applies vibration motion to a set of haptic gloves indicating an unsuccessful artisanal action. For example, program 150 applies a haptic response to the correct hand as the user incorrectly performs the artisanal action. In another embodiment, program 150 adjusts the applied haptic response based on a level of deviation from the artisanal action compared to current user performance of the artisanal action. In an embodiment, responsive to program 150 identifying that the user unsuccessfully executed an artisanal action, program 150 inputs the conditions of failure into MARL 152 and presents a new set of guidance or instructions to the user. In an embodiment, responsive to program 150 identifying that the user successfully executed an artisanal action, program 150 continues to present subsequent artisanal actions utilizing subsequently created training avatars.

In an embodiment, program 150 leverages the predicted actions from MARL 152 to provide computational instructions to a robot or a system controlling robotic agents. In this embodiment, the robot mimics the mannerisms (i.e., haptic data 124) of an artisan captured from haptic feedback. In a further embodiment, program 150 utilizes input from a skilled artisan, utilizing haptic capture device 110, to provide robotic systems with artisan actions allowing the robots to imitate or mimic a particular artisanal style. For example, program 150 utilizes a smart haptic glove, smart sensors, and cameras to capture the style and technique of a painter painting on canvas. In this example, program 150 feds the captured information into MARL 152, leveraging the output of MARL 152 to infuse the artisanal skill onto a robotic system. In an embodiment, program 150 maps artisanal actions or skills to a robotic manufacturing equivalent. For example, artisanal actions, intended for the user, are converted into a robotic manufacturing format, allowing the robotic manufacturing of an artisanal product.

Figure 3:
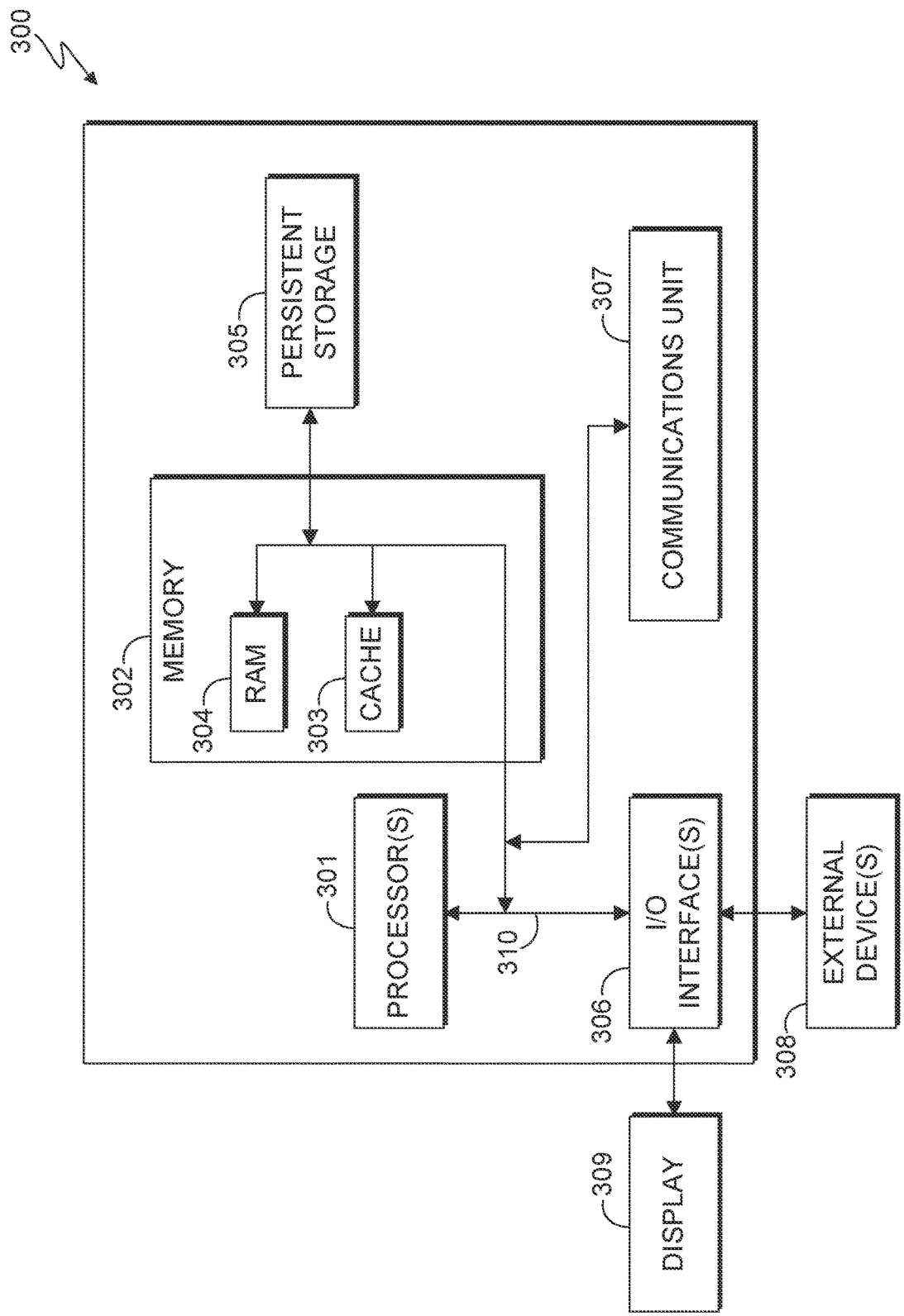
FIG. 3 is a block diagram of components of the server computer, in accordance with an embodiment of the present invention.

FIG. 3 depicts block diagram 300 illustrating components of server computer 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 120 each include communications fabric 304, which provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of computer processor(s) 301 by holding recently accessed data, and data near accessed data, from memory 302.

Program 150 may be stored in persistent storage 305 and in memory 302 for execution by one or more of the respective computer processor(s) 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data can be stored in persistent storage 305 for access and/or execution by one or more of the respective processors 301 via cache 303.

Communications unit 307, in these examples, provides for communications with other data processing systems or devices. In these examples, communications unit 307 includes one or more network interface cards. Communications unit 307 may provide communications through the use of either or both physical and wireless communications links. Program 150 may be downloaded to persistent storage 305 through communications unit 307.

I/O interface(s) 306 allows for input and output of data with other devices that may be connected to server computer 120. For example, I/O interface(s) 306 may provide a connection to external device(s) 308, such as a keyboard, a keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 305 via I/O interface(s) 306. I/O interface(s) 306 also connect to a display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    deriving, by one or more computer processors, a base corpus by capturing time series haptic data from an artisan performing an artisanal skill comprising a plurality of artisanal actions, wherein each artisanal action in the plurality of artisanal actions is associated with a time interval;
    training, by one or more computer processors, a multi-agent reinforcement learning (MARL) model utilizing the derived base corpus, wherein the MARL model outputs a vector representing one or more predicted artisanal actions required to complete the artisanal skill;
    generating, by one or more computer processors, a training avatar utilizing a trained generated adversarial network fed with one or more parameters identified from a user requesting guidance for the artisanal skill and the output vector of the trained MARL model, wherein the one or more user parameters describe a physical condition of the user; and
    guiding, by one or more computer processors, the user with the generated training avatar in an execution of the artisanal skill with instructions specific to the one or more parameters identified from the user.

2. The computer-implemented method of claim 1, wherein the instructions specific to the one or more parameters identified from the user are selected from the group consisting of: required force, body position, and pressure.

3. The computer-implemented method of claim 2, further comprising:
    responsive to a successful or unsuccessful execution of the artisanal action, applying, by one or more computer processors, a haptic response to one or more haptic gloves or a haptic suit associated with the user based on a level of deviation of the artisanal action.

4. The computer-implemented method of claim 1, further comprising:
    adjusting, by one or more computer processors, a reward function associated with the MARL model by internally maximizing the reward function over iterative time intervals while adjusting subsequent artisanal actions utilizing collected haptic data feedback.

5. The computer-implemented method of claim 1, wherein the user parameters are selected from the group consisting of: user preferences, user limitations, and user proportions.

6. The computer-implemented method of claim 1, wherein the training avatar is generated at each time interval in an augmented or holographic form.

7. The computer-implemented method of claim 1, further comprising:
    providing, by one or more computer processors, the output vector of the trained MARL model to a robotic system, wherein the robotic system mimics the artisanal skill.

8. A computer program product comprising:
one or more computer readable storage media and program instructions stored on the one or more computer readable storage media, the stored program instructions comprising:
program instructions to derive a base corpus by capturing time series haptic data from an artisan performing an artisanal skill comprising a plurality of artisanal actions, wherein each artisanal action in the plurality of artisanal actions is associated with a time interval;
program instructions to train a multi-agent reinforcement learning (MARL) model utilizing the derived base corpus, wherein the MARL model outputs a vector representing one or more predicted artisanal actions required to complete the artisanal skill;
program instructions to generate a training avatar utilizing a trained generated adversarial network fed with one or more parameters identified from a user requesting guidance for the artisanal skill and the output vector of the trained MARL model, wherein the one or more user parameters describe a physical condition of the user; and
program instructions to guide the user with the generated training avatar in an execution of the artisanal skill with instructions specific to the one or more parameters identified from the user.

9. The computer program product of claim 8, wherein the instructions specific to the one or more parameters identified from the user are selected from the group consisting of: required force, body position, and pressure.

10. The computer program product of claim 9, wherein the program instructions, stored on the one or more computer readable storage media, further comprise:
program instructions to, responsive to a successful or unsuccessful execution of the artisanal action, apply a haptic response to one or more haptic gloves or a haptic suit associated with the user based on a level of deviation of the artisanal action.

11. The computer program product of claim 8, wherein the program instructions, stored on the one or more computer readable storage media, further comprise:
program instructions to adjust a reward function associated with the MARL model by internally maximizing the reward function over iterative time intervals while adjusting subsequent artisanal actions utilizing collected haptic data feedback.

12. The computer program product of claim 8, wherein the user parameters are selected from the group consisting of: user preferences, user limitations, and user proportions.

13. The computer program product of claim 8, wherein the training avatar is generated at each time interval in an augmented or holographic form.

14. The computer program product of claim 8, wherein the program instructions, stored on the one or more computer readable storage media, further comprise:
program instructions to provide the output vector of the trained MARL model to a robotic system, wherein the robotic system mimics the artisanal skill.

15. A computer system comprising:
one or more computer processors;
one or more computer readable storage media; and
program instructions stored on the computer readable storage media for execution by at least one of the one or more processors, the stored program instructions comprising:
program instructions to derive a base corpus by capturing time series haptic data from an artisan performing an artisanal skill comprising a plurality of artisanal actions, wherein each artisanal action in the plurality of artisanal actions is associated with a time interval;
program instructions to train a multi-agent reinforcement learning (MARL) model utilizing the derived base corpus, wherein the MARL model outputs a vector representing one or more predicted artisanal actions required to complete the artisanal skill;
program instructions to generate a training avatar utilizing a trained generated adversarial network fed with one or more parameters identified from a user requesting guidance for the artisanal skill and the output vector of the trained MARL model, wherein the one or more user parameters describe a physical condition of the user; and
program instructions to guide the user with the generated training avatar in an execution of the artisanal skill with instructions specific to the one or more parameters identified from the user.

16. The computer system of claim 15, wherein the program instructions, to guide the user with the generated training avatar in the execution of the artisanal skill, comprise:
program instructions to demonstrate an artisan action utilizing the generated training avatar with user specific instructions for required force, body position, and pressure.

17. The computer system of claim 16, wherein the program instructions stored, on the one or more computer readable storage media, further comprise:
program instructions to, responsive to a successful or unsuccessful execution of the artisanal action, apply a haptic response to one or more haptic gloves or a haptic suit associated with the user based on a level of deviation of the artisanal action.

18. The computer system of claim 15, wherein the program instructions, stored on the one or more computer readable storage media, further comprise:
program instructions to adjust a reward function associated with the MARL model by internally maximizing the reward function over iterative time intervals while adjusting subsequent artisanal actions utilizing collected haptic data feedback.

19. The computer system of claim 15, wherein the user parameters are selected from the group consisting of: user preferences, user limitations, and user proportions.

20. The computer system of claim 15, wherein the training avatar is generated at each time interval in an augmented or holographic form.

* * * * *